Oct. 10, 1944.                A. C. HORESI                2,359,763
                      CONTINUOUS CONVERSION OF STARCH
                         Filed July 13, 1940           3 Sheets-Sheet 1
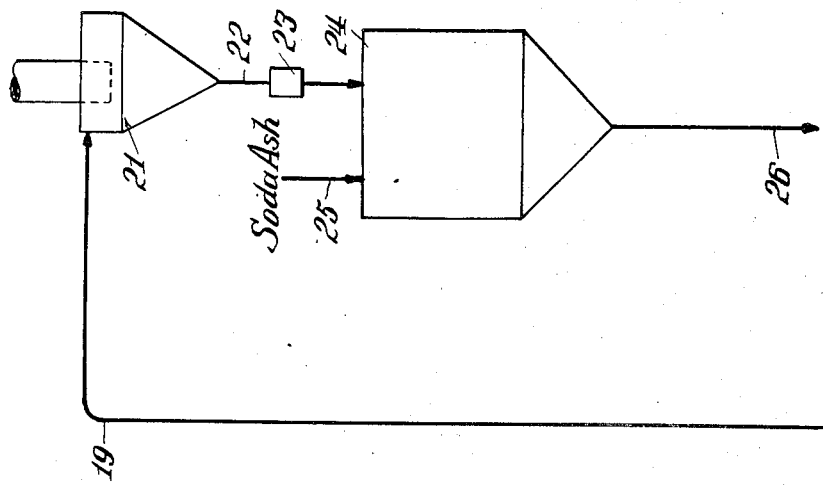
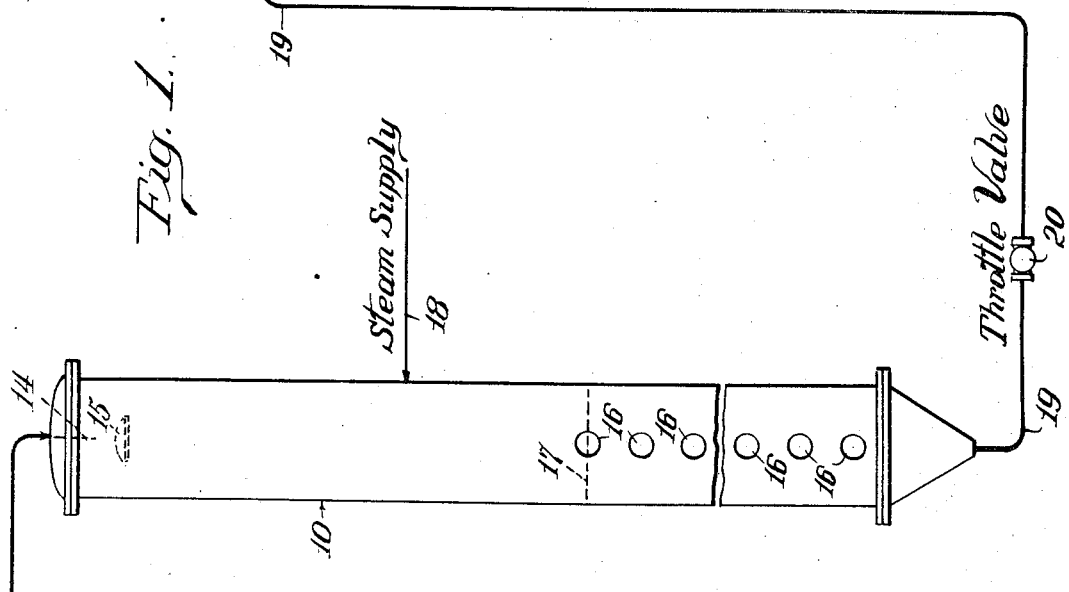
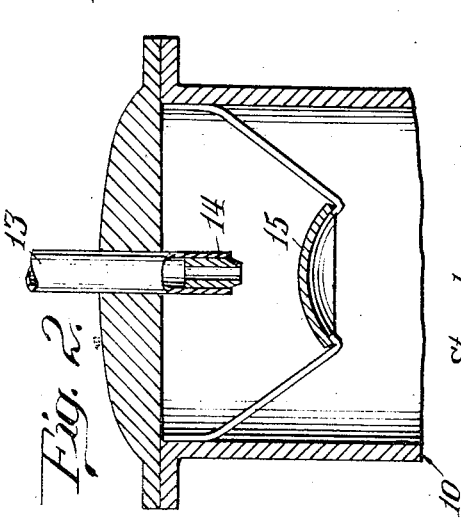
Inventor
Anthony C. Horesi
By
Attorneys

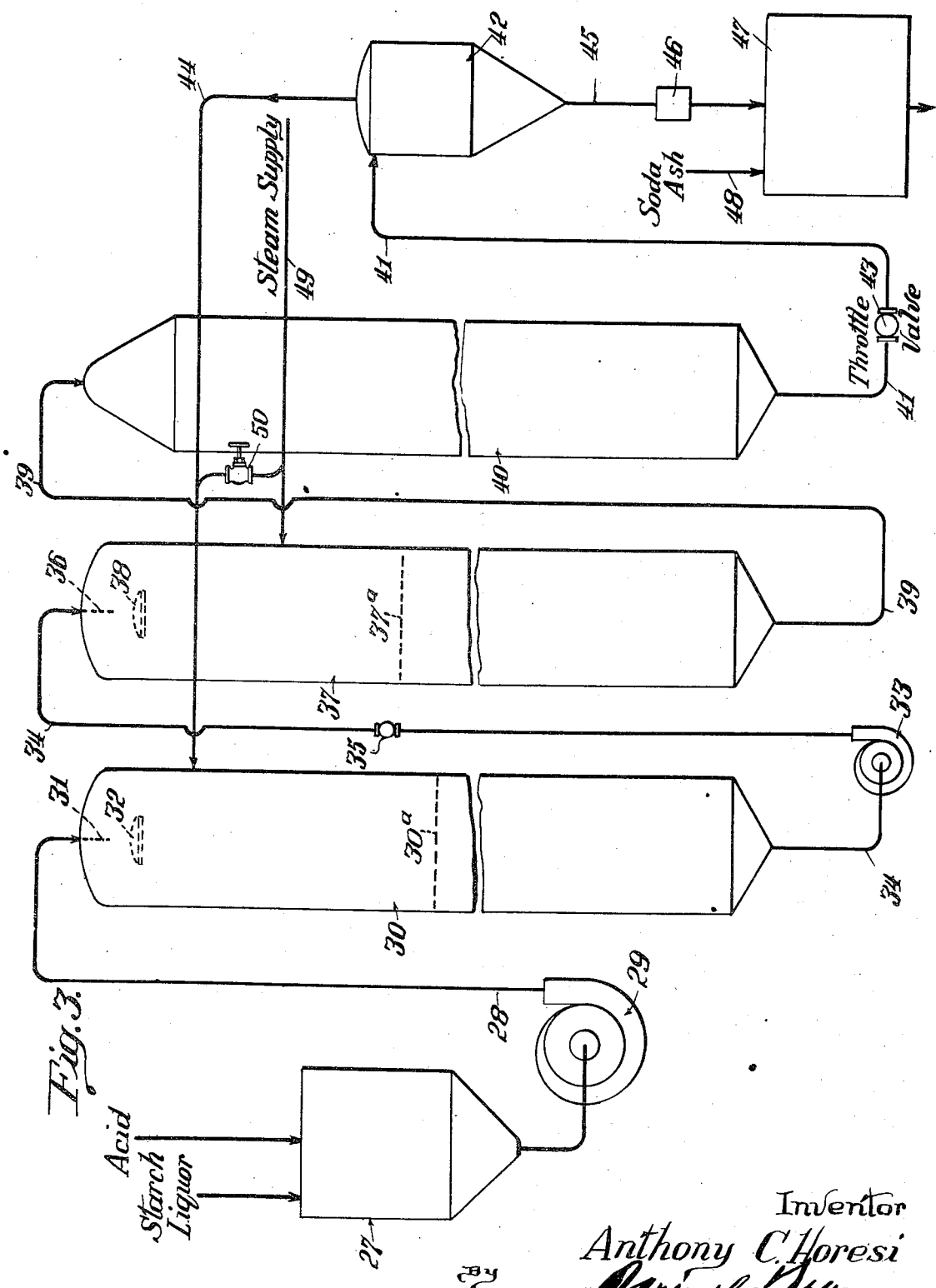

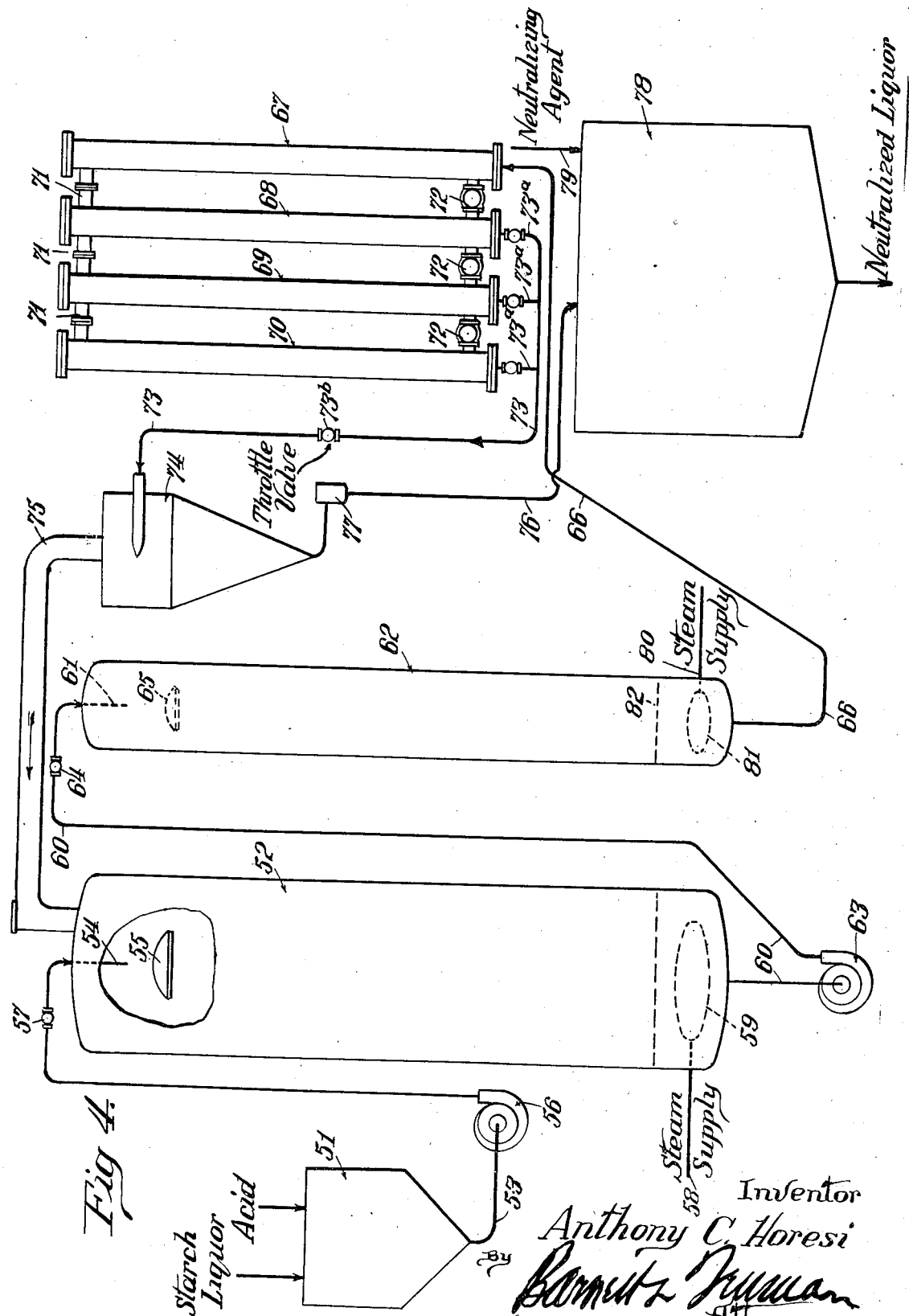

Patented Oct. 10, 1944

2,359,763

UNITED STATES PATENT OFFICE 2,359,763

CONTINUOUS CONVERSION OF STARCH

Anthony C. Horesi, Downers Grove, Ill., assignor to Corn Products Refining Company, New York, N. Y., a corporation of New Jersey Application July 13, 1940, Serial No. 345,295

13 Claims. (Cl. 127—38)

This invention relates to the conversion of starch and other dextrose polymers in the production of high purity crystalline dextrose, starch sugars of lesser purity, starch syrups and other dextrose or dextrose-containing products.

The term "dextrose polymers" is intended to include starch and also the polysaccharides in dextrose mother liquors, such as "first greens" and "hydrol," which liquors are frequently reconverted to increase their dextrose content, that is, to de-polymerize the polysaccharides. Such reconverting operations, as well as the conversion of starch, come within the scope of the present invention.

One of the principal objects of the invention is to provide a practical and operative process for the continuous conversion of starch and other dextrose polymers to take the place of the commonly employed batch process of conversion.

A further object of the invention is to provide a process, more particularly a continuous process, whereby the dextrose content of the converted liquor may be increased.

A further object of the invention is to provide a process whereby the converting time for a given volume of material is considerably reduced.

A further object of the invention is to provide a process of conversion which will permit the use of a smaller amount of hydrolyzing or converting acid with the advantage that, besides economy of acid and neutralizing agent, the converted liquor will contain a smaller amount of "ash," largely sodium chloride if hydrochloric acid, as is customary, is used as a converting agent and soda ash to neutralize the acid after the conversion has been effected. The reduction in the amount of salt in the converted liquor is of particular importance in the case of conversion for production of high purity crystalline dextrose for the reason that the salt resulting from the neutralization of the converting acid tends to inhibit the crystallization of the dextrose.

The processes of converting starch for the production of solid sugars, i. e. high purity crystalline dextrose and the so-called 70 and 80 corn sugars, for the production of starch syrups, commonly called "glucose," as well as the processes for reconversion of mother liquors, in use in most starch sugar and syrup manufacturing plants, are batch processes, a typical operation, for the production of solid sugars, being as follows: 3260 gallons of 11° Baumé starch liquor is acidified with 110 pounds of 18° Baumé hydrochloric acid to give the liquor a pH of about 1.6. This liquor is put into an autoclave and heated, by injection of steam from a steam ring in the bottom of the autoclave for about 10 minutes to give the batch a temperature of about 300° F., that is, a pressure of 50 pounds per square inch. This pressure is maintained for 20 minutes longer so as to bring about the conversion of the starch and the batch is then discharged and neutralized with about 35 pounds of soda ash or until the liquor has a pH of about 5.0. The liquor is refined by adsorption treatment, concentrated and, in the case of high purity crystalline dextrose production, is crystallized in motion in crystallizers and the massecuite centrifuged.

This batch method of conversion has been in common use, almost universal use, in fact, for many years, during which time several attempts have been made to substitute for its continuous processes. See United States patents to Sovereign et al., 948,485, February 8, 1910, and 1,183,408, May 16, 1916; to Lillie, 1,014,311, January 9, 1912, and 1,023,257, April 16, 1912; and to Hagen, 1,927,312, September 19, 1933, and 1,928,891, October 3, 1933. These continuous conversion processes have either been failures or their use much restricted due to practical disadvantages in operation.

The present invention provides an operative, and, from all points of view, practical system of continuous conversion, having, specifically, the advantages above noted.

The present invention in its preferred embodiment consists, essentially, of a continuous process in accordance with which the starch liquor (or mother liquor as the case may be), containing, preferably, considerably less converting acid than has been customary, is introduced, in a finely divided and widely distributed state, i. e. in the form of minute discrete particles, into a body of steam at pressures much higher than have been used heretofore in converting operations, batch or continuous, so that the liquor is heated, almost instantaneously and with great uniformity to the temperature desired for conversion, which is, in the case of the present invention, preferably, a temperature much higher than has been heretofore used in starch converting operations. The heated liquor collected in the lower part of the heating vessel is forced under such steam pressure to flow in an undisturbed and unagitated stream through a conduit of considerable length and relatively small diameter, so as to insure uniformity of the flow, and at such a relatively high velocity, preferably, that there is no opportunity for colloidal matter (the material which when the liquor is neutralized is known as "refinery mud") to settle and coat or clog the apparatus. The steam for heating the acidified liquor is introduced in such manner as not to disturb the continuous and uniform flow of the liquor through the converting conduit. This is a radically different procedure from the batch process in which the steam, introduced from a steam ring in the bottom of the autoclave, keeps the liquor in constant agitation. Preferably, according to the present invention the steam is introduced into the heating vessel at a point above the liquid level therein, or at least very near the level of said liquid so as to avoid disturbing or interfering with the constant and uniform flow of the heated liquor undergoing conversion. The acidified liquor may be introduced into, and distributed through, the body of steam in the heating chamber by means of an atomizing nozzle or nozzles; but, preferably, the liquor is forced through an ordinary nozzle or pipe of small bore against a convex splash plate in the top of the chamber. This has been found to be an effective way of breaking up the liquid into minute particles or drops and distributing the same uniformly through the body of steam. Perforated plates are objectionable as a means for distributing the incoming starch liquor because of the liability of the perforations to be clogged, the lack of uniformity in distribution which such method entails, and the difficulty in obtaining the break-up of the liquor in sufficiently minute particles to insure uniform heating of all particles.

The process of the present invention involves heating the liquor, the starch and water suspension, for example, in a very brief period of time by direct contact with steam at high pressure. Indirect application of heat or direct contact of the starch liquor with low pressure steam will not serve the purposes of the invention, at least so far as its preferred objects are concerned. The process of the invention also involves, preferably, a continuous, uniform and uninterrupted flow of the heated liquor, preferably at a high velocity, say from 20 to 50 feet per minute, for the purpose above indicated.

The invention also provides, as an optional but not necessary step, a gelatinizing or pasting operation separate from and precedent to the heating operation which raises the liquor to the converting temperature; the pasting operation being carried out, preferably, in the same manner as the heating operation above described, but at a lower steam pressure, which, however, given a steam temperature somewhat above the gelatinizing temperature of the starch. This pre-pasting operation preferably utilizes steam flashed from the converted liquor when the latter is discharged from the converter.

Another important advantage of the process of this invention, more particularly when utilized for converting starch for the production of solid sugars, is that a higher dextrose content is obtained in the converted liquor giving a higher yield of dextrose even though the "purity," i. e. reducing sugar calculated as dextrose, may not be any higher than with the usual batch type of conversion. In converting for crystal sugar, for example, the conversion of the starch to dextrose is carried as far as possible. Under these conditions a certain amount of the dextrose is polymerized into higher molecular weight non-crystallizable sugars. The two processes of hydrolyzing or depolymerizing the starch to form dextrose and of polymerizing the dextrose to higher molecular weight sugars go on simultaneously. A part of the non-dextrose sugar produced in this way consists of non-crystallizable reducing sugars so that the actual dextrose content in a converted liquor is lower than its so-called purity. Under the conditions of the present invention, as carried out in the preferred manner, the dextrose content for a given purity is higher than with the usual batch method of conversion.

The ordinary batch gravities of 11°-12° Baumé may be employed for sugar conversions according to the present invention. A workable range is from 10° to 15° Baumé.

For glucose conversion according to the present invention the gravity of starch liquors should be higher than for sugar conversions, as in batch practice, usually 23°-24° Baumé; but somewhat lower if the starch is not prepasted. The advantages of the employment of the invention for the production of glucose are: shorter converting time, higher dextrose content; and some savings—although not as great as in sugar conversions—of acid and neutralizing agent.

The process of the invention may also be used in the re-conversion of mother liquors such as first greens and hydrol with the advantage of increased dextrose content, reduced sodium chloride in the neutralized liquor, shorter converting time, and economy of acid and neutralizing agent.

The invention is illustrated diagrammatically in the accompanying drawings, wherein:

Fig. 1 shows, diagrammatically, a simple form of apparatus in which there is no pre-pasting of the starch.

Fig. 2 is a fragmentary vertical sectional view of the upper end of the pasting, heating and converting vessel shown in Fig. 1.

Fig. 3 shows a form of apparatus involving a separate pre-pasting vessel; and

Fig. 4 shows a modification of the system shown in Fig. 3.

Referring first to Fig. 1, 10 designates a vessel, vertically arranged, and of small diameter in proportion to its length, in which the starch is pasted, heated to the converting temperature and converted. 11 is a mixing tank for mixing acid with the starch and water suspension. This mixture is pumped to vessel 10 by pump 12, through pipe 13 provided with nozzle 14 (Fig. 2) which extends through the top of vessel 10; the pump exerting sufficient pressure on the starch liquor to overcome the steam pressure in vessel 10 and force a stream of the starch liquor against a baffle plate 15 with enough impact to break up the stream into small particles and distribute the particles throughout the body of steam in the upper part of vessel 10. In practice the stream pressure in pipe 13 is about 50 pounds per square inch in excess of the steam pressure in vessel 10; and the baffle plate has a convex spherical surface to receive the stream of starch liquor. The bore of the nozzle has a diameter of about $\frac{1}{16}$ of an inch for each gallon of liquor introduced into the vessel per minute.

The vessel is provided, preferably, with a series of gauge glasses 16 for convenience in maintaining the desired liquid level in the vessel. Steam is introduced into the upper part of the vessel 10, above the liquid level, indicated by the dotted line 17, through steam supply pipe 18. The converted liquor is discharged from the bottom of vessel 10 through pipe 19 which is provide with an adjustable needle valve, or other type of throttling valve, 20 for controlling the flow of liquids through the apparatus. Pipe 19 leads to a flash chamber 21, preferably of the cyclone type, from which the converted liquor passes through pipe 22, provided with a steam trap 23, to the neutralizing tank 24 which receives a neutralizing solution, soda ash, for example, through pipe 25. The neutralized liquor is discharged at 26 for further treatment.

Referring to Fig. 3, 27 indicates the mixing chamber, 28 a pipe, in which is arranged pump 29, for delivering the starch liquor into a pasting vessel 30 through nozzle 31 and against baffle plate 32. The nozzle and baffle plate may be the same as shown in Fig. 2. The starch, reduced by impact upon the baffle plate to a finely divided and distributed state, is pasted by contact with the steam in the upper part of vessel 30; and is forced, by pump 33 in pipe 34, which contains an adjustable throttle valve 35, through nozzle 36 into the heating and converting vessel 37 against baffle plate 38. The steam in vessel 30 is at a temperature to paste or gelatinize the starch. The steam in vessel 37 is at a much higher pressure and temperature, sufficient, that is, to heat the starch liquor to the very high converting temperature contemplated by this invention. The heated, and probably partially converted liquor, in vessel 37 passes through pipe 39 into a second converting vessel 40, which is kept full of the liquor, the liquor being discharged from this vessel 40 through pipe 41, to the cyclone flash chamber 42; pipe 41 being provided with an adjustable throttle valve 43. Steam flashed from the liquor in the cyclone 42 passes through pipe 44 to the pasting chamber 30, being introduced at a point above the liquid level in said vessel, indicated by dotted line 30ª. The converted liquor from the cyclone passes through pipe 45, provided with a steam trap 46, into the neutralizing tank 47 which receives neutralizing agent through pipe 48. Live steam is introduced into the heating vessel 37 through pipe 49 which has a valved connection 50 with pipe 44 intended to be used only on starting up the apparatus. Pipe 49 taps vessel 37 at a point above the liquid level 37ª in said vessel.

The vessels 37 and 40 constitute, in effect, a single heating and converting vessel in the nature of an extended conduit of much greater length than diameter. Except for mechanical convenience the two vessels might be combined structurally in one long vessel; or, conversely, the converting vessel might be divided into a larger number of units as may be found convenient.

The latter arrangement is shown in Fig. 4 in which 51 is the mixing vessel for starch liquor and acid, 52 the pasting vessel, 53 a pipe leading from the mixing vessel 51 to the pasting vessel 52, and terminating in a nozzle 54, such as is shown in Fig. 2, which delivers the liquid against the splash plate 55; pipe 53 having arranged therein a pump 56 and an adjustable throttle valve 57. Steam is supplied to the pasting vessel 52 through steam supply pipe 58 and steam ring 59. The pasted starch passes through pipe 60 and nozzle 61 (Fig. 2) into the upper end of the heating vessel 62; pipe 60 having arranged therein a pump 63 and adjustable throttle valve 64. The pasted starch is delivered through nozzle 61 against a splash plate 65. The starch paste, raised to the desired converting temperature in vessel 62, passes through pipe 66 into a tubular converting pipe 67. This is one of a series of pipes 68, 69, 70, the number of which may be increased in order to increase the capacity of the apparatus or to lengthen the converting time. In the drawings these four converting tubes or pipes are shown as connected at the top by pipe connections 71, and at the bottom by valved pipe connections 72. A common discharge pipe 73 has valved connections 73ª with the tubular converting elements 68, 69 and 70. This discharge pipe 73, which is provided with an adjustable throttle valve 73ᵇ, leads to a cyclone separator 74 connected by pipe 75 for delivering the flashed steam to the pasting vessel 52. The converted liquor, separated at 74, passes through pipe 76, provided with a trap 77, to the neutralizing vessel 78 which receives neutralizing agent through pipe 79.

Steam is supplied to the heating vessel 62 through steam pipe 80 and steam ring 81. The purpose of vessel 62 is to raise the pasted starch liquor to the desired converting temperature. If conversion takes place in this vessel, it is incidental. Ordinarily the liquid level in the vessel would be low as indicated by the dotted line 82, and consequently the agitation of the small amount of liquid above the steam supply ring through the introduction of the steam is a negligible factor. The conversion takes place, except possibly for some initial conversion in the heating vessel 62, while the heated liquor is passing through the tubular converting elements 67—70 through which the flow of liquor is uniform, uninterrupted and without substantial agitation. The valved connections 72 allow any number of the tubular elements 67—70 to be employed. The pasting and converting vessels should be insulated to minimize heat losses and prevent substantial lowering of the converting temperature.

It will be understood that the invention is not to be limited to the particular apparatuses shown and just described.

The following are examples of the application of the invention to practice. These specific examples are to be regarded as merely informative and typical and not as limiting the invention to the particular operating data given therein; the intention being to cover all modifications and variations in both process and apparatus within the scope of the hereto appended claims.

*Example 1—Sugar conversion—apparatus of Fig. 1.*—11° Baumé starch liquor is acidified with about 0.017 pound per gallon of 18° Baumé hydrochloric acid, being about half the amount of acid used in the ordinary processes of batch conversion, and this gives the liquor a pH of about 2.0 instead of the usual 1.6. The acidified starch liquor is introduced into the combined pasting, heating and converting vessel 10 which latter is under 165 pounds steam pressure (373° F.; 190° C.). The vessel 10 consists in this case of a vertical pipe 10 feet long and 5 inches in diameter. The nozzle 14 has a bore ⅛ of an inch in diameter. Inflow to and outflow from the vessel 10 are controlled, through control of pump 12 and adjustment of needle valve 20, to maintain a regulated constant volume of liquor in the vessel and a uniform flow of liquor therethrough. The adjustment in this example is such as to give a converting time of about 7 minutes. The converted liquor is neutralized with soda ash to a pH of 5.0.

It will be understood that in the converting operation the amount of acid, time of treatment, the temperature and the gravity of the starch liquor are inter-related variables; and a change in one variable factor can be compensated for by a change in another or others. However, it has been found possible; in acccordance with this invention, to increase the dextrose content of the converted liquor, to reduce the amount of acid and thereby reduce the salt content of the converted liquor with consequent further increase of dextrose by crystallization, and to shorten the time of the converting operation, by operating the converting process at very much higher pressures and temperatures than have been heretofore considered feasible or possible. Temperatures as high as 388° F.; 198° C. (200 pounds steam pressure per square inch) may be used to good advantage, which is four times the usual batch conversion pressure. However, with higher temperatures than this, there is danger that the advantages of high temperature will be offset, or perhaps more than offset, by the increased tendency for the dextrose to polymerize and form higher molecular weight sugars.

Reasons of economy also suggest operating at as high gravities as possible. However, for sugar conversions it does not appear to be possible to obtain complete conversion, that is, maximum purities and dextrose contents, at gravities which are too high. The process of the present invention, however, with properly constructed apparatus, will permit of gravities up to 15° Baumé, and perhaps higher; and for glucose conversions the usual 23°-24° Baumé liquors.

Conversions made in accordance with Example 1 gave a purity of 91.1% and a dextrose content of 88.8%. The ordinary batch conversion, requiring 30 minutes, including the heating up of the liquor and using double the amount of acid, which conversion may be regarded as typical, ordinarily gives a converter liquor having a purity of about 91.0% and dextrose content of about 86.0%. The ash in the liquor converted continuously in accordance with this invention was 0.51%. Batch conversion gives an ash content of about 1.0%. The ash, with hydrochloric acid as a converting agent and soda ash as a neutralizing agent, is largely sodium chloride. As the result of the higher dextrose contents and the lower ash contents in the converted liquors made in accordance with this invention, the amount of crystalline dextrose produced from a given quantity of converter liquor may be considerably increased over that obtained by batch conversion.

The process of the present invention uses, preferably, as a converting acid, hydrochloric acid now generally used for starch converting operations. It would be possible to use sulfuric acid, as was customary in the past, or any other acid, organic or inorganic, which will not oxidize the starch or break down under the high pressures employed by the present invention. Obviously other alkaline substances might be used in place of soda ash for neutralizing the acid. Whatever acid is used, the high converting temperatures in accordance with the present invention will permit a reduction in the amount of the acid and consequently a smaller ash content in the neutralized liquor.

*Example 2—Glucose conversion—apparatus of Fig. 1.*—In the apparatus as shown in Fig. 1 it is not practical to convert for glucose at the usual gravity of 23°-24° Baumé, due to the fact that a starch suspension of this gravity does not flow satisfactorily into the converter. For the higher gravities, therefore, pre-pasting appears to be necessary as will be hereinafter described. The apparatus of Fig. 1, however, will satisfactorily handle a starch suspension of 19° Baumé. This liquor is acidified with 4½ c. c. of 18° Baumé hydrochloric acid (0.011 pound) per gallon of starch milk, giving a pH of about 2.3. The pressure is 160 pounds per square inch and the conversion time 2½ to 3 minutes. The converted liquor from an operation of this character had a purity of 50% instead of the usual glucose purity, under the batch system, of about 43%. The converting time, 2½ to 3 minutes, is considerably lower than the usual converting time of 12 minutes for batch conversion.

*Example 3—Re-conversion of first greens—apparatus of Fig. 1.*—18° Baumé first greens, mother liquor from the centrifuging of crystal dextrose, is acidified to a pH of 2.18, instead of the usual pH of 1.6, the amount of acid added being about one-half of what is customary. The pressure is 165 pounds per square inch and the converting time 12 minutes.

The greens re-converted in this manner had a purity of 86%, a dextrose content of 82% and an ash content of 3.6% in comparison with the usual batch converted liquor, converted at 1.6 pH, which may have a purity of 86%, a detxrose content of 79.9% and an ash content of 4.70%.

*Example 4—SO₂ conversion—apparatus of Fig. 1.*—11° Baumé starch liquor having a pH of 6.21 is acidified with sulfurous acid to a pH of 1.41 and converted for 18 minutes. The converted liquor will have a purity of 87.3%, a dextrose content of 82.3% and an ash content of 0.67% when converted under a pressure of 165 pounds per square inch (373° F.; 190° C.). Most of the sulfur dioxide is volatilized and removed with the steam. The ash content represents other acidic material, probably sulfuric acid from oxidation of the sulfurous acid.

*Example 5—Sugar conversion—apparatus of Fig. 3.*—11° Baumé starch liquor acidified to a pH of 2.0 is pasted in the paste vessel 30 under a steam pressure of 12 pounds (244° F.; 118° C.) for about 5 minutes. The pasted liquor is introduced into the heating vessel 37 under 160 pounds steam pressure per square inch (371° F.; 188° C.), and the heated liquor caused to flow through vessels 37 and 40; the total converting time being about 5 minutes and the rate of flow through vessels 37, 40 from 20 feet to 50 feet per minute, preferably at the higher velocity. The operation gave a converted liquor of 91%-92% purity, having a dextrose content of 88%, and an ash content, when neutralized, of 0.5%. The acid used, 0.017 pound 18° Baumé hydrochloric acid per gallon of starch liquor, is about one-half the usual amount of acid for batch conversion.

*Example 6—Glucose conversion—apparatus of Fig. 3.*—A starch suspension of 23°-24° Baumé, acidified with 0.012 pound 18° Baumé hydrochloric acid (instead of the usual 0.018 pound), per gallon of the suspension is first pasted for 4 minutes under steam pressure of 5 pounds per square inch (228° F.; 109° C.), and then heated in vessel 37 to a temperature of (371° F.; 188° C.), corresponding to a pressure 160 pounds per square inch, and converted for 2½ minutes with the stream of converting liquor flowing at 50 feet per minute. The result is increased dextrose content and somewhat reduced ash content; the converting time being, of course, much shorter than with batch conversion.

I claim:

1. Continuous process of converting dextrose polymers which comprises: introducing, in a finely divided state, an acidified liquor containing said dextrose polymers into a body of steam maintained at a pressure between 100 and 200 pounds per square inch in the upper part of a vessel, the lower part of which collects the liquor, after it has been uniformly heated to a converting temperature by passing through said body of steam; and forcing said liquor through a conduit until the desired degree of conversion is effected, the pressure in said conduit being sufficiently high to maintain the liquor therein at a converting temperature.

2. Continuous process of converting starch which comprises: introducing a starch liquor of about 10° to about 24° Baumé, acidified to a pH of about 1.4 to about 2.3, in a finely divided state into a body of steam in the upper part of a vessel, said body of steam being at a pressure of about 100 pounds to about 200 pounds per square inch, the lower part of which vessel collects the starch liquor, after it has been uniformly heated to a converting temperature by passing through said body of steam; and forcing said starch liquor through a conduit at a converting temperature in a continuous undisturbed stream until the desired degree of conversion is effected.

3. Continuous process of converting starch which comprises: introducing a starch and water suspension of a gravity between 10° and 15° Baumé, acidified to a pH of about 2, in a finely divided state into a body of steam maintained at a pressure of about 100 pounds to about 200 pounds per square inch in the upper part of a vessel, the lower part of which collects the starch liquor after it has been uniformly heated to a converting temperature by passing through said body of steam; and forcing the heated starch liquor through a conduit in a continuous, undisturbed stream at a velocity of at least 20 feet per minute until the desired degree of conversion is effected.

4. Continuous process of converting starch which comprises: introducing a starch and water suspension of a gravity between 10° and 15° Baumé, acidified to a pH of about 2 and in a finely divided state, into a body of steam maintained at a pressure of about 100 pounds to about 200 pounds per square inch in the upper part of a vessel, the lower part of which collects the starch liquor after it has been uniformly heated to a converting temperature by passing through said body of steam; forcing the heated starch liquor through a conduit in a continuous, undisturbed stream at a velocity of at least 20 feet per minute until the desired degree of conversion is effected; and introducing steam into said vessel at a point above the liquid level therein.

5. Continuous process of converting starch which comprises: introducing an acidified starch and water suspension in a finely divided state into a body of steam at a gelatinizing but subconversion temperature to bring about the pasting of the starch; introducing the pasted starch in a finely distributed state into a body of steam at a converting temperature in the upper part of a vessel, the lower part of which collects the starch liquor after it has been uniformly heated to said converting temperature; and forcing said starch liquor through a conduit until the desired degree of conversion is effected.

6. Continuous process of converting starch which comprises: introducing an acidified starch and water suspension in a finely divided state into a body of steam at a pressure between atmospheric pressure and about 12 pounds per square inch to paste the starch; introducing the pasted starch in a finely divided state into a body of steam at a pressure between 100 pounds and 200 pounds per square inch in the upper part of a vessel, the lower part of which collects the starch liquor after it has been uniformly heated to said converting temperature; and forcing said starch liquor through a conduit while maintaining the liquor at converting temperature until the desired degree of conversion is effected.

7. Continuous process of converting starch for the production of a solid dextrose sugar which comprises: introducing a starch liquor of a gravity between 10° and 15° Baumé, acidified with hydrochloric acid to a pH of about 2, into an atmosphere of steam maintained at a pressure between 100 pounds and 200 pounds per square inch to heat the starch to a converting temperature, forcing the heated starch liquor through a conduit in a continuous undisturbed stream until the desired degree of conversion is effected; separating steam from the converted liquor; and neutralizing the acid in the liquor, whereby the salt content of the liquor is minimized and the yield of dextrose increased when said liquor is crystallized.

8. Continuous process of converting dextrose polymers which comprises: subjecting a liquor containing said dextrose polymers of a gravity of about 11° Baumé to about 24° Baumé, acidified to a pH of about 1.4 to about 2.3, and in a finely and uniformly distributed state, to the action of steam at a pressure between 100 and 200 pounds per square inch to heat the liquor to a converting temperature; and then forcing said liquor through a conduit in a continuous stream at velocity of about 20 to about 50 feet per minute.

9. Process of converting dextrose polymers which comprises: subjecting a liquor, containing said dextrose polymers, of a density of about 11° to about 24° Baumé, in a finely divided and uniformly distributed state, and at a pH of about 1.4 to about 2.3, to direct contact with steam at a pressure between 100 and 200 pounds per square inch; keeping a body of the liquor thus heated at substantially said pressure until the desired degree of conversion is effected; and then releasing the pressure and separating the steam from the converted liquor.

10. Process of converting dextrose polymers which comprises: subjecting a liquor containing said dextrose polymers of about 11° to about 24° Baumé and acidified with hydrochloric acid to a pH of about 1.4–2.3 to heat at a pressure between 100 and 200 pounds per square inch; keeping the liquor under such pressure until conversion is effected; and then releasing the pressure and separating the steam from the converted liquor.

11. The improvement in the process of converting starch which comprises converting a starch liquor of a density of about 10° to about 15° Baumé at a pH of about 2, and at a steam pressure between 100 and 200 pounds per square inch for a period sufficient to effect the desired degree of conversion.

12. Process of continuously converting starch for the production of starch syrup which comprises: first heating a starch suspension of 23°-24° Baumé acidified with about 0.012 pound of 18° Baumé hydrochloric acid per gallon of the suspension to paste the starch; introducing the pasted starch, in a finely divided state, into a body of steam at a pressure between 100 and 200 pounds per square inch; keeping a body of the pasted starch under this pressure until the desired conversion takes place; and then releasing the pressure and separating the steam from the starch syrup.

13. Process for continuously converting dextrose-containing mother liquors which comprises: subjecting the mother liquor of about 18° Baumé acidified to a pH of about 2.18 and in a finely divided and uniformly distributed state to contact with steam at a pressure between 100 and 200 pounds per square inch; maintaining a body of liquor thus heated at said steam pressure until the desired degree of conversion is effected; and then releasing the pressure and separating the steam from the converted liquor.

ANTHONY C. HORESI.